United States Patent [19]

Huhman et al.

[11] Patent Number: 4,484,588
[45] Date of Patent: Nov. 27, 1984

[54] COMBINED CONCAVE AND ROCK DOOR STRUCTURE

[75] Inventors: Michael L. Huhman, Kansas City; Michael R. Stuber, Raytown, both of Mo.

[73] Assignee: Allis-Chalmers Corp., Milwaukee, Wis.

[21] Appl. No.: 593,698

[22] Filed: Mar. 26, 1984

[51] Int. Cl.³ .................. A01F 12/10; A01F 12/16
[52] U.S. Cl. ..................... 130/27 JT; 130/27 L
[58] Field of Search ............. 130/27 J, 27 JT, 27 S, 130/27 L

[56] References Cited

U.S. PATENT DOCUMENTS

| | | | |
|---|---|---|---|
| 2,083,879 | 6/1937 | Thompson | 130/27 S |
| 2,959,175 | 11/1960 | Oberholtz et al. | 130/27 JT |
| 3,089,299 | 5/1963 | Claas | 130/27 JT |
| 3,101,721 | 8/1963 | Fuller | 130/27 JT |
| 3,124,138 | 3/1964 | Claas | 130/27 JT |
| 3,552,396 | 1/1971 | Gerhardt et al. | 130/27 J |
| 3,756,248 | 9/1973 | Mathews | 130/27 JT |
| 3,771,530 | 11/1973 | Wassell | 130/27 JT |
| 4,262,679 | 4/1981 | James | 130/27 JT |
| 4,271,850 | 6/1981 | Ryczek | 130/27 JT |

FOREIGN PATENT DOCUMENTS

| | | | |
|---|---|---|---|
| 1130641 | 5/1962 | German Democratic Rep. | 130/27 L |
| 201816 | 9/1967 | U.S.S.R. | 130/27 S |

*Primary Examiner*—Paul J. Hirsch
*Attorney, Agent, or Firm*—Charles L. Schwab

[57] ABSTRACT

A combined concave and rock door structure is provided for an agricultural harvester wherein the rock door and the arms supporting the concave are pivotally mounted on the same transverse axis by a pair of pivot support structures. A control mechanism is provided for adjusting the threshing clearance of the concave and the concave is adjustable to maintain concentricity with the threshing rotor.

11 Claims, 6 Drawing Figures

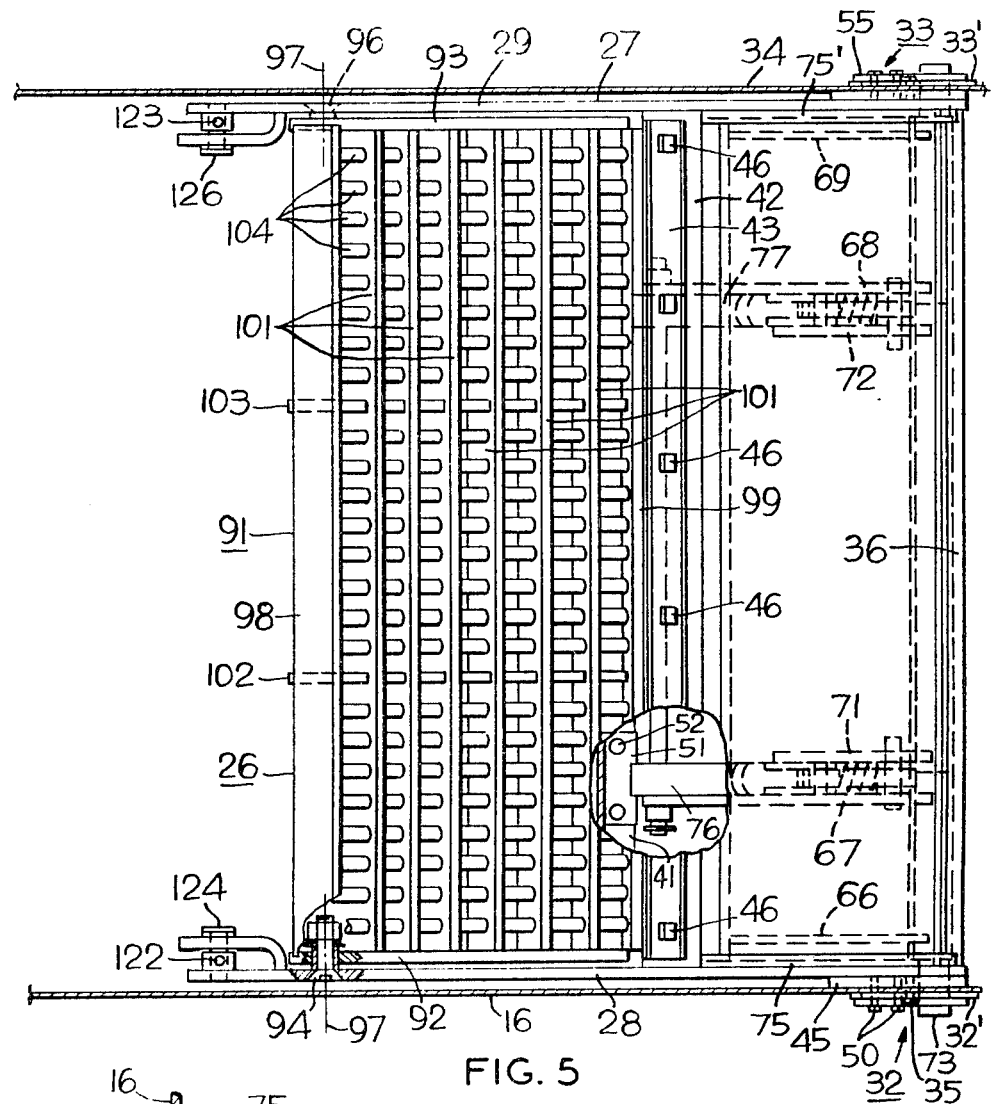
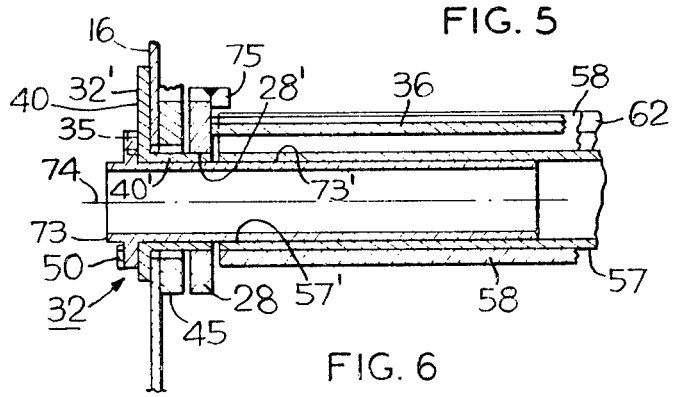
FIG. 5
FIG. 6

COMBINED CONCAVE AND ROCK DOOR STRUCTURE

TECHNICAL FIELD

This invention relates to agricultural harvesters and more particularly to the concave and rock door features thereof.

BACKGROUND OF THE INVENTION

Heretofore others have provided rock door and concave structures for agricultural harvesters wherein the rock door is disposed between the feeder conveyor and the threshing rotor. Two such prior constructions are illustrated in patents U.S. Pat. No. 3,124,138 to R. Claas for "Threshing Machine Having a Specific Cylinder and Concave" issued Mar. 10, 1964 and U.S. Pat. No. 3,089,299 issued to R. Claas on May 14, 1963 for a "Stone Trap For Combines".

SUMMARY OF THE INVENTION

The present invention is particularly useful in an agricultural harvester having a frame, a threshing rotor mounted on the frame for rotation about a transverse rotor axis, and a feeder conveyor operable to deliver crop material to the rotor by way of feeder opening.

In carrying out the invention, a combined concave and rock door structure is provided which includes a pair of laterally spaced and longitudinally extending arms pivotally connected at their forward ends to the combine frame adjacent the feeder opening for vertical swinging movement about a transverse swing axis parallel to the rotor axis. A transverse brace is rigidly secured to and extends between the arms at longitudinally intermediate points of the arms. A rock door is disposed laterally between th arms and is pivotally connected at its front end to the combine frame for vertical swinging movement about the swing axis between a generally horizontal closed position wherein a floor is provided between the feeder opening and the transverse brace and a downwardly extending open position wherein a vertical opening is presented. Latch means are provided for releasably securing the door in its closed position. The latch means release the door when it is subjected to a predetermined downward force, thereby permitting it to swing to its open position. A concave is mounted on the arms and extends rearwardly from the transverse brace and in complementary confronting relation to the rotor with proper spacing to achieve threshing of crop material passing between the concave and the rotor. A control mechanism is mounted on the frame and connected to the combined concave and rock door structure to pivotally adjust the position of the latter about the swing axis thereby changing the clearance between the rotor and the concave.

The rear end of the concave may be pivotally connected to the arms on a transverse concave axis parallel to the rotor axis and adjustable support means may be provided on the arms for vertically adjusting the concave by causing it to swing about the concave axis.

It is a primary object of the present invention to provide a combined concave and rock door structure wherein the concave and rock door pivot on a common axis.

It is a further object of the present invention to provide a combined concave and rock door structure wherein the concave and rock door are mounted on a frame which is pivoted on the same axis as the rock door. The concave may be pivotally mounted on the frame with adjusting means to maintain concentricity of the concave with the threshing rotor.

It is a further object of this invention to provide pivot structures which permit the rock door to be removed from the combine without necessitating the removal of the concave structure even though the concave structure and rock door are pivotally mounted on the same axis.

BRIEF DESCRIPTION OF THE DRAWINGS

One embodiment of the present invention is shown in the drawings in which:

FIG. 5 is a view taken along the line V—V in FIG. 2; and

FIG. 6 is a view taken along the line VI—VI in FIG. 1.

DETAILED DESCRIPTION OF THE DRAWINGS

Figure 1:
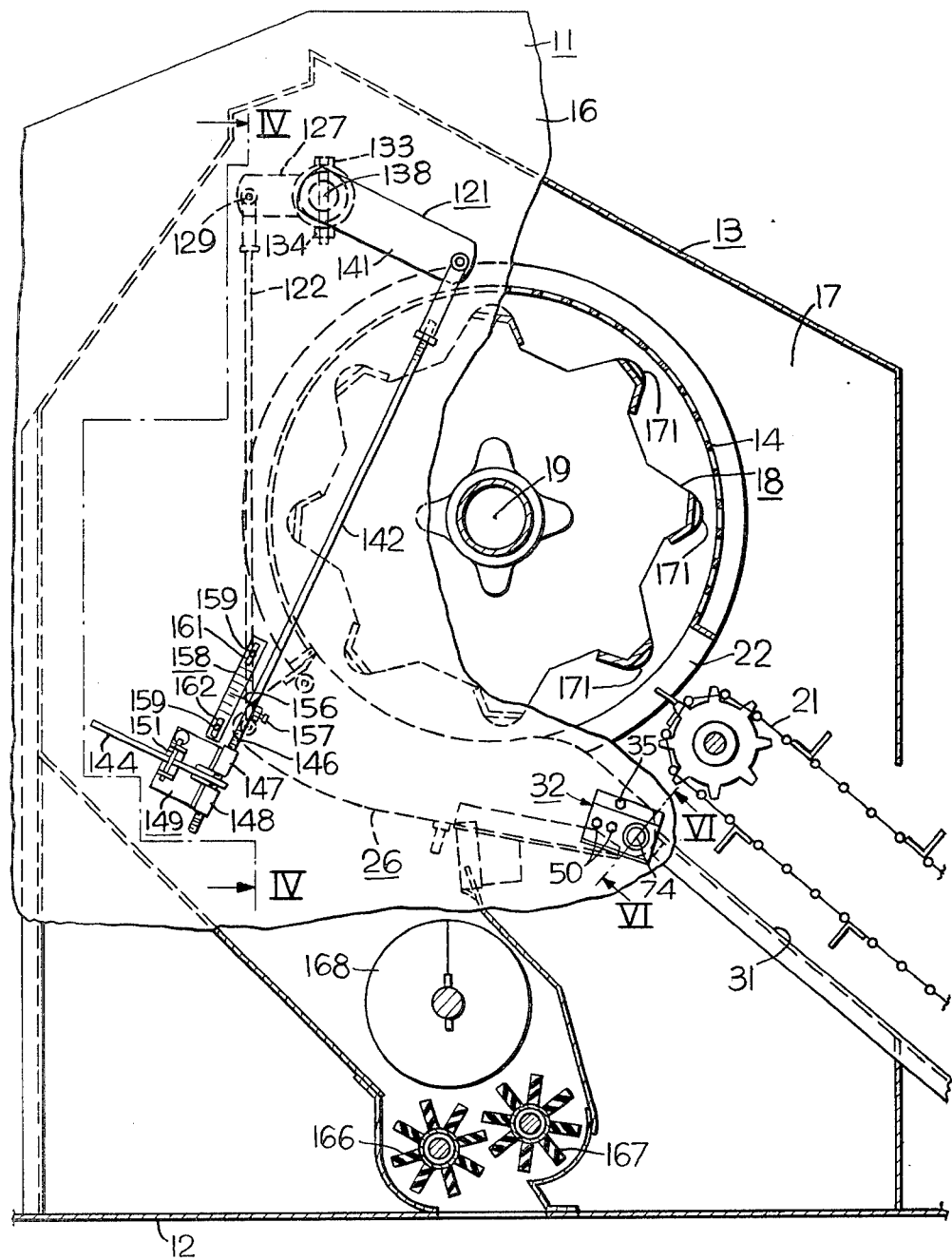
FIG. 1 is a partial side view of a combine with parts broken away for illustration purposes.

Referring to FIG. 1 an agricultural harvester or combine 11 includes a main frame 12 supporting a housing 13 for the threshing section of the combine which includes a foraminous cage 14 secured at its opposite ends to side walls 16, 17. A threshing rotor 18 is disposed concentrically within the cage 14 and is mounted on the side walls 16, 17 for rotation about a transverse horizontal axis 19. A feeder conveyor 21 delivers crop material from the header, not shown, at the front of the combine to an opening 22 at the lower front of the cage 14. Referring also to FIGS. 2 through 6, a combined concave and rock door structure 26 includes a frame 27 having a pair of longitudinally extending arms 28, 29 which are pivotally connected at their forward ends near the rear end of the feeder conveyor bottom wall 31 by a pair of pivot support structures 32, 33 mounted in side wall 16 and in an intermediate vertical wall 34.

The forward ends of the arms 28, 29 are rigidly interconnected by a narrow transverse floor beam 36 and the longitudinally intermediate parts of the arms 28, 29 are rigidly interconnected by a structural member in the form of a transverse brace 37 which includes an angle part 38, a vertical wall 39 and a bottom plate 41. The parts of the brace 37 are welded to one another and their laterally opposite ends are welded to longitudinally intermediate points of the arms 28, 29. A floor plate 42 is mounted on top of the brace 37 and a replaceable channel section threshing bar 43 is disposed on top of the floor plate 42. The floor plate 42 and the bar 43 extend transversely substantially the entire distance between the arms 28, 29 and are releasably secured to the brace 37 by bolts 46 and nuts 47. A pair of latch components in the form of striker plates 51 are releasably secured to the brace 37 by bolts 52 and nuts 53.

A rock door 56 includes a transverse cylindrical pipe-like tubular part 57 at its front end to which a transverse L-section brace or angle 58 is welded. The front end of a curved floor plate 61, which is fabricated from a plate of uniform thickness, has its front end welded to the top of the L-section brace 58. The floor plate 61 includes an upwardly and rearwardly extending floor 62 and a rear part which extends downwardly to form a rear wall 63 of the door. Longitudinally extending vertical walls 66, 67, 68, 69 are welded at their front ends to the L-section brace 58, at their upper edges to the underside of the floor 62 and at their rear ends to the wall 63. A pair of vertical walls 71, 72 are also welded to the brace 58 and to the floor 62 but do not extend all the way to the rear wall 63. As shown in FIG. 6, a radially inward facing cylindrical surface 57' on an axial end of tubular part 57 is in bearing engagement with a radially outward facing cylindrical surface 73' presented by a tubular support tube or stub shaft 73 mounted coaxial with a pivot boss 32' to form the pivot support structure 32. The pivot support structure 33 is a reverse image of the pivot support structure 32.

Pivot boss 32' is secured to the vertical side wall 16 of the combine by a cap screw 35 which extends through aligned openings in the flange part 40 of boss 32' and wall 16 and which is in threaded engagement with a threaded opening in a spacer 45. The cylindrical portion 40' of pivot boss 32' presents a radially outward facing cylindrical bearing surface in pivotal bearing engagement with a radially inward facing cylindrical bearing surface 28' defining a bore in arm 28, such bearing surfaces being aligned on axis 74. The stub shaft 73 is secured to the side wall 16 by cap screws 50 extending through aligned openings in the flange part of stub shaft 73, the flange part 40 and the wall 16 and in threaded engagement with drilled and tapped openings in the spacer 45. Thus, the arm 28 is pivotally supported by pivot boss 32' and the rock door is pivotally supported by stub shaft 73 with both the arm 28 and the rock door 56 pivoting about common transverse axis 74.

The laterally opposite edges of the floor 62 extend beneath sealing strips 75, 75' welded to the laterally inner sides of the arms 28, 29 at the upper edges of the latter. The fit between the seal strips 75, 75' and the floor 62 is such as to minimize grain loss at the lateral edges of the rock door.

Figure 2:
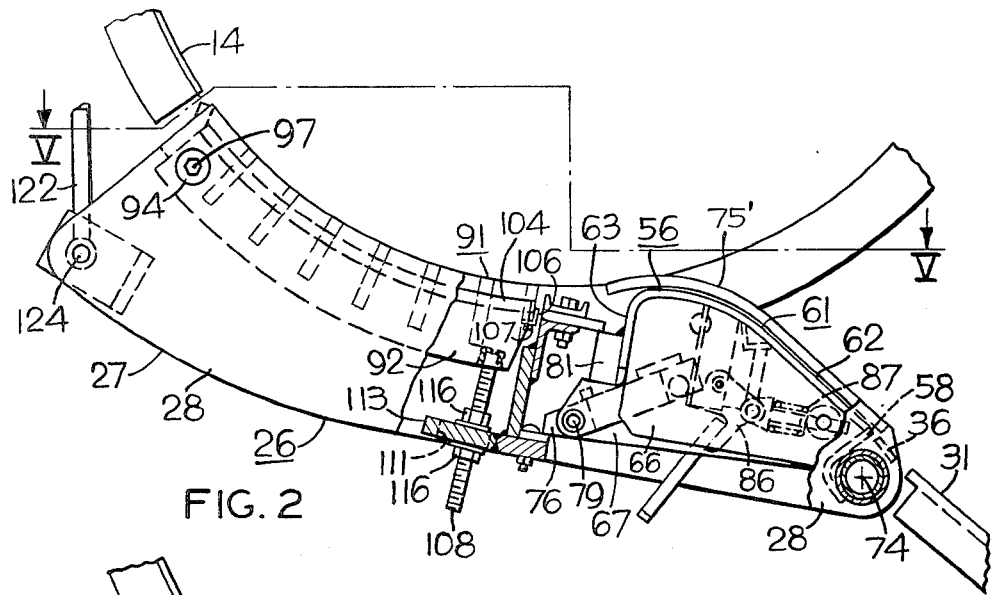
FIG. 2 is a side view of the combine of FIG. 1 with parts broken away to show a concave and rock door structure.
Figure 3:
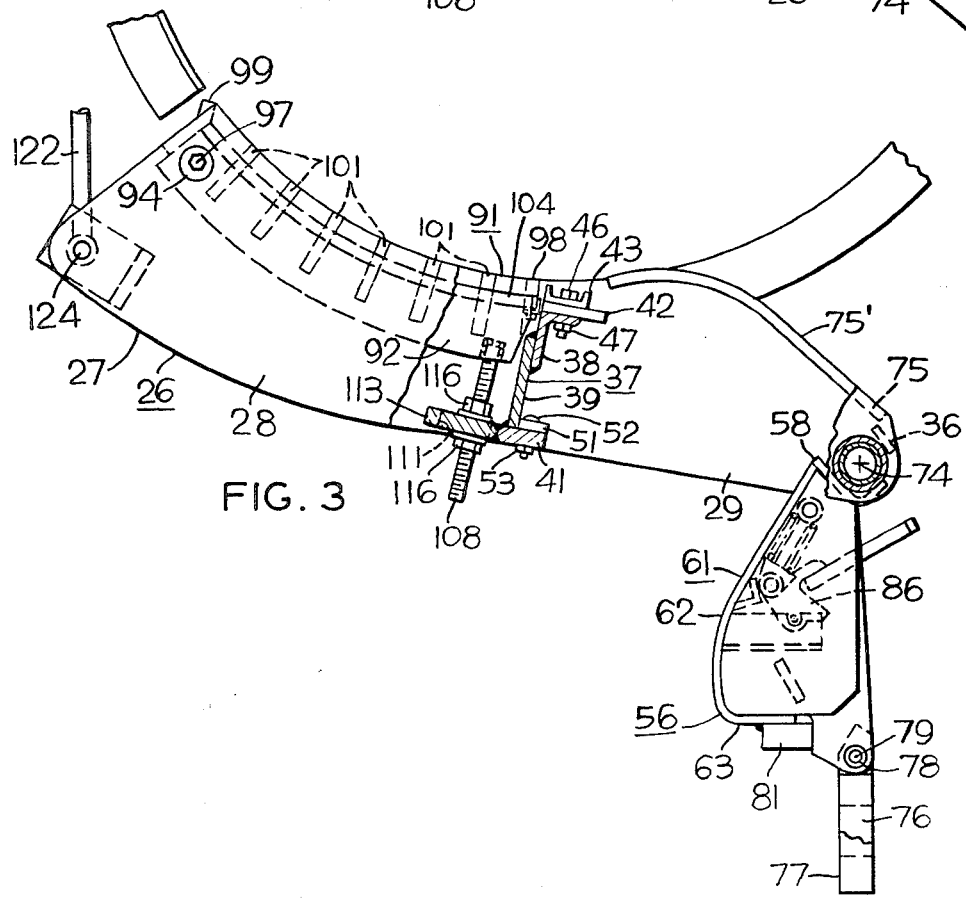
FIG. 3 is a view similar to FIG. 2 showing the rock door in an open position.
Figure 4:
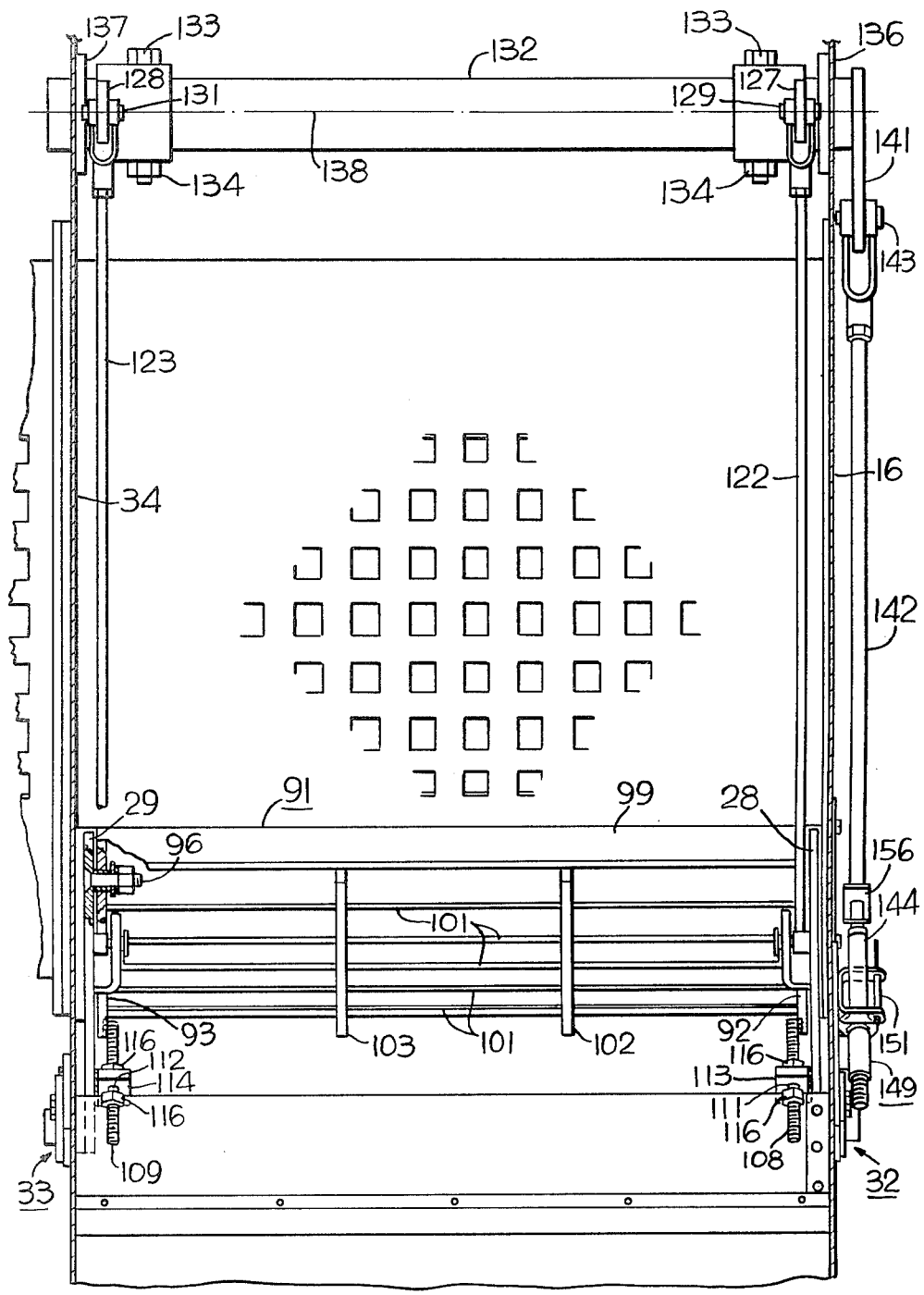
FIG. 4 is a view taken along the line IV—IV in FIG. 1.

A pair of latches 76, 77 are pivotally connected to vertical walls 67, 68 of the rock door 56 by a transverse pivot pin 78 extending through aligned openings in the walls 67, 68 and the latches 76, 77 whereby, upon tripping, the latches pivot about a transverse pivot axis 79. In the latched condition of the rock door 56, as shown in FIGS. 2 and 5, a transverse bar 81 extending the lateral distance between the arms 28, 29 and welded to the wall 63 and vertical walls 67, 68, is in nearly abutting relation to the underside of plate 42 on the brace 37 to effect a seal or continuous floor, thereby preventing loss of grain. The rear ends of the latches 76, 77 abut the upper side of the striker plates 51, only one of which is shown. A pivotable locking element 86 is biased by a coil compression spring 87 to an over center locking position, as shown in FIG. 2, wherein a part of the locking element 86 engages the underside of the front end of the latch 76. When a rock or other foreign object too large to pass between the floor 62 and the rotor 18 exerts a predetermined downward force on the door 56 the rear end of the latch 76 will cause the locking element to rotate counterclockwise, as viewed in FIGS. 2 and 3 compressing spring 87 until a centered condition is reached. Further downward movement of the door trips the latch to an over center unlatched position, shown in FIG. 3, thereby releasing the latch 76 and allowing the door to fall by gravity to the unlatched open position shown in FIG. 3. Latch 77 is a reverse image of latch 76.

A grate or concave 91 has its laterally opposite longitudinally extending arms 92, 93 pivotally connected at their rear ends to the rear ends of the arms 28, 29, respectively, of the frame 27 by a pair of pivot bolts 94, 96 for vertical swinging movement about a transverse pivot axis 97. The concave 91 is fabricated by welding opposite lateral ends of front and rear concave bars 98, 99 and six intermediate concave bars 101 to the arms 92, 93. Stiffners 102, 103 are welded to the concave bars 98, 99, 101 and laterally spaced curved rods 104 are inserted into openings in the concave bars 98, 101. The rods 104 are held in place by an L-section retaining strip 106 secured to the bar 98 by can screws 107. A pair of threaded adjusting rods 108, 109 are welded at their upper ends to the front ends of the arms 92, 93 of the concave 91 and extend downwardly through longitudinally elongated slots 111, 112 in brackets 113, 114 welded to and extending rearwardly from intermediate brace 37. Additionally, the brackets 113, 114 are welded at their laterally outer sides to the laterally inner sides of the arms 28, 29 of the frame 27. By adjusting lock nuts 116 on the threaded adjusting rods 108, 109, the front end of the concave 91 can be pivoted about axis 97 to adjust the concentricity of the concave 91 to the rotor 18. In other words, the center of curvature of the concave can be made to be coaxial with rotor axis 19.

The combined concave and rock door structure 26 may be adjusted about its forward pivot axis 74 through operation of an adjusting mechanism 121 which includes a pair of generally vertical control rods 122, 123 pivotally connected at their bottom ends to the rear ends of arms 28, 29 by a pair of aligned transverse pivot pins 124, 126. The upper ends of the control rods are pivotally connected to the free ends of crank arms or levers 127, 128 by aligned pivot pins 129, 131. The crank arms are secured to a torsion bar in the form of a tubular rock shaft 132 by bolts 133 and nuts 134. The rock shaft 132 is pivotally mounted on the vertical walls 16, 34 by bearings 136, 137 for rocking movement about a transverse axis 138. A lever arm 141 is secured to the laterally outer end of the rock shaft 132 which extends outwardly from the side wall 16. The upper end of an adjustment rod 142 is pivotally connected to the free end of the lever arm 141 by a transverse pivot pin 143. A reversible ratchet wrench 144 operatively engages a nut on a threaded lower end 146 of the adjustment rod 142. The threaded end 146 of the rod 142 extends through aligned openings in leg portions 147, 148 of a bifurcated bracket 149 connected to the side wall 16. The bracket also carries a removable pin 151 for releasably securing the handle of the ratchet wrench 144 against movement. An indicator or pointer 156 is releasably secured to the rod 142 by a cap screw 157 and a graduated measuring strip 158 is adjustably secured to the wall 16 by cap screws 159 extending through elongated slots 161, 162 in the strip 158. The indicator 156 advises the operator of the clearance between the concave 91 and the rotor 18.

OPERATION

The rock door 61 provides a continuous floor between the feeder conveyor floor 31 and the concave 91. Threshed material falling through the concave 91 is accelerated downwardly to the cleaning section of the combine by accelerator rolls 166, 167. A distribution of threshed material along the length of the accelerator rolls is achieved by a distribution auger 168. The control mechanism 121 is adjusted by ratchet wrench 144 to provide a predetermined clearance between the concave 91 and the rotor rasp bars 171. It should be noted that the front of the concave 91 can be adjusted up or down relative to the frame 27 to provide uniform clearance between the concave bars 98, 99, 101 and the rasp bars 171 of the threshing rotor 18.

When, due to threshing different crops or different crop conditions, it becomes necessary to change the concave clearance, the ratchet wrench is released and operated to raise or lower the rear end of the combined concave and rock door structure 26. Since this movement is a swinging movement about axis 74, the change in clearance with the rotor 18 at concave bar 99 will be greater than the change in clearance with the rotor 18 at concave bar 98. By pivotally connecting the concave 91 to the arms 28, 29 and by providing adjusting means in the form of rods 108, 109, brackets 113, 144 and nuts 116, the operator can adjust the concave up or down at its front end to again provide a substantially uniform clearance between the concave bars 98, 101 and 99 and the rotor rasp bars 171. In other words, the concave can be brought back into concentricity with the rotor. By making the shaft 132 from a relatively large diameter tube, it effectively serves as a torque tube or torsion bar having minimal torsional deflection, thus insuring relatively even adjustment of the concave across the transverse length of the concave bars.

The combined rock door and concave structure 26 herein described simplifies the construction of the concave and rock door components in a rather crowded interior area of the combine. Pivoting the rock door on the same transverse axis as the concave frame allows the door and the concave to pivot on a pair of compact pivot support structures 32, 33. The unique pivot support structures 32, 33 permit the rock door 56 to be removed from the concave frame 27 by removing cap screws 50 and axially withdrawing stub shaft 73 and by removing the corresponding stub shaft 55 of pivot support structure 33. The cap screw 35 will continue to hold pivot boss 32' in place and, thus, the support for arm 28 of the concave frame 27 remains in place. Similarly, the pivot boss 33' of the pivot support structure 33 will hold the arm 29 in place when the stub shaft 55 is removed. Thus, if the rock door 56 becomes damaged and needs to be replaced, it can be replaced by removing stub shafts 73, 55 without removing the concave frame 27. The intermediate brace 37 serves to support a bridging floor 42 and a threshing bar 43. The brace 37 also supports latch parts in the form of striker plates 51 and serves as a structural member of the concave frame 27 adding greatly to its rigidity.

The embodiments of the invention in which an exclusive property or privilege is claimed are defined as follows:

1. In an agricultural harvester having a threshing section, a threshing rotor mounted in the threshing section for rotation about a rotor axis, and a feeder conveyor operable to deliver crop material to the rotor by way of a feeder opening in the threshing section, the combination comprising:
   a pair of laterally spaced vertical walls at opposite sides of said feeder opening,
   a combined concave and rock door structure including
      a pair of laterally spaced and longitudinally extending arms pivotally connected at their forward ends to said vertical walls, respectively, adjacent said feeder opening for vertical swinging movement about a transverse swing axis generally parallel to said rotor axis,
      a transverse brace rigidly secured to and extending between said arms at longitudinally intermediate points thereof,
      a rock door disposed laterally between said arms and pivotally connected at its front end to said vertical walls for vertical swinging movement about said swing axis between a closed position wherein said door provides a floor between said feeder opening and said transverse brace and a downwardly extending open position wherein a vertical opening is presented, said rock door extending rearwardly to said transverse brace in its closed position,
      latch means releasably securing said door in its closed position, said latch means being operable to release said door, permitting it to swing to its open position, when said door is subjected to a predetermined downward force, and
      a concave mounted on said arms and extending rearwardly from said transverse brace, said concave having a plurality of longitudinally spaced transverse bars in confronting relation to said rotor, and
   control mechanism on said harvester connected to said structure operable to pivotally adjust the position of the latter about said swing axis thereby changing the threshing clearance between said rotor and said concave.

2. The harvester of claim 1 wherein the rear end of said concave is pivotally connected to said arms on a transverse concave axis substantially parallel to said rotor axis and further comprising adjustable support mechanism supporting the front end of said concave on said arms for selectively adjusting the vertical position of the front end of said concave causing swinging movement of said concave about said concave axis.

3. The harvester of claim 1 wherein a pair of aligned pivot bosses are secured to said vertical walls and pivotally support said arms, respectively, and a pair of aligned stub shafts are secured to said vertical walls and pivotally support said rock door.

4. The harvester of claim 3 wherein said pivot bosses present tubular portions pivotally supporting said arms, respectively, and said stub shafts extend through said tubular portions, said stub shafts being removable without requiring removal of said pivot bosses.

5. The harvester of claim 1 wherein said control mechanism includes a torque tube pivotally mounted on said vertical walls for pivoting about a transverse torque tube axis parallel the said rotor axis, a pair of laterally spaced crank arm levers on said tube and a pair of rods interconnecting to free ends of said levers with the rear ends of said arms, respectively.

6. In an agricultural harvester having a frame, a threshing rotor mounted on the frame for rotation about a transverse rotor axis, and a feeder conveyor operable to deliver crop material to the rotor, the combination comprising:
   a combined concave and rock door structure including
      a pair of laterally spaced and longitudinally extending arms pivotally connected at their forward ends to said frame near the rear end of said feeder conveyor for vertical swinging movement about a transverse swing axis generally parallel to said rotor axis, a transverse member rigidly secured to and extending between said arms at longitudinally intermediate points thereof, a rock door disposed laterally between said arms and pivotally connected at its front end to said frame for vertical swinging movement about said swing axis between a generally horizontal closed position wherein said door provides a floor between said feeder conveyor and said transverse member and a downwardly extending open position wherein a vertical opening is presented for discharge of rocks, said rock door extending rearwardly to said transverse member in its closed position, latch means releasably securing said door in its closed position, said latch means being operable to release said door permitting it to swing to its open position, when said door is subjected to a predetermined downward force, a concave mounted on said arms and extending rearwardly from said transverse member, said concave being positioned relatively close to said rotor so as to achieve threshing of crop material passing therebetween from said feeder conveyor, and control mechanism on said frame and connected to said structure operable to pivotally adjust the position of the latter about said swing axis thereby changing the clearance between said rotor and said concave.

7. The harvester of claim 6 wherein the rear end of said concave is pivotally connected to said arms on a transverse concave axis parallel to said rotor axis and further comprising adjustment means supporting the front end of said concave on said arms for vertical adjustment causing swinging movement of said concave about said concave axis.

8. The harvester of claim 7 wherein said adjustment means includes horizontally extending brackets on said arms, respectively, each of said brackets having a vertical opening, a pair of threaded rods extending downwardly from said front end of said concave through said openings and nuts on said rods on opposite vertical sides of said brackets.

9. The harvester of claim 6 wherein a pair of aligned and laterally opposite cylindrical bearing surfaces are presented by the front of said rock door and further comprising a pair of stub shafts releasably secured to said frame presenting cylindrical bearing surfaces in complementary engagement with said bearing surfaces on said rock door, said bearing surfaces being coaxial with said swing axis.

10. The harvester of claim 9 and further comprising pivot bosses releasably secured to said frame and presenting aligned openings through which said stub shafts extend, said pivot bosses pivotally supporting said arms, respectively.

11. The harvester of claim 6 and further comprising a transverse threshing bar releasably secured to the top of said transverse member.

* * * * *